United States Patent

[11] 3,588,840

[72] Inventors Takuya Nomura
2320, Kamiboya, Hoya-Machi Kitatama-Gun;
Yasuo Tada, 710,2-chome, Kugayama, Suginami-Ku, Tokyo-to, Japan

[21] Appl. No. 796,704
[22] Filed Feb. 5, 1969
[45] Patented June 28, 1971
[32] Priority Dec. 2, 1963
[33] Japan
[31] 64511/63
Continuation-in-part of application Ser. No. 413,583, Nov. 24, 1964, now abandoned.

[54] METHOD OF BLOCK RECORDING DATA ON A MAGNETIC TAPE
4 Claims, 6 Drawing Figs.

[52] U.S. Cl. .......... 340/172.5
[51] Int. Cl. .......... G11b 5/00, G06f 3/00
[50] Field of Search .......... 340/174.1, 172.5; 235/157

[56] References Cited

UNITED STATES PATENTS

| | | | |
|---|---|---|---|
| 2,913,707 | 11/1959 | Goldberg et al. | 340/174 |
| 3,293,613 | 12/1966 | Gabor | 340/172.5 |
| 3,333,247 | 7/1967 | Hadley | 340/172.5 |
| 3,346,849 | 10/1967 | Jones et al. | 340/172.5 |
| 3,444,541 | 5/1969 | Irwin | 340/174.1 |
| 3,454,930 | 7/1969 | Schoeneman | 340/172.5 |
| 3,482,230 | 12/1969 | Girling | 340/174.1 |

*Primary Examiner*—Paul J. Henon
*Assistant Examiner*—R. F. Chapuran
*Attorneys*—Robert E. Burns and Emmanuel J. Lobato

ABSTRACT: A method of block recording data on a magnetic tape comprises (1) feeding data at a selected first rate to a storage unit until there has been stored a selected amount less than data contained in one block and (2) feeding the stored data to a recording unit having a tape transport at a second selected rate which is faster than the first rate while continuing to feed data to the storage unit. The rates of storage and recording are selected so that the data stored in the storage unit are exhausted simultaneously with completion of recording of one block of data by the recording unit. The tape transport operates at a constant speed during both periods, the length of the interrecord gap between successive blocks being determined by the selected storage and recording rates.

PATENTED JUN 28 1971 3,588,840

SHEET 4 OF 4

METHOD OF BLOCK RECORDING DATA ON A MAGNETIC TAPE

This application is a continuation-in-part of our application Ser. No. 413,583 now abandoned filed Nov. 24, 1964 which claims priority of our earlier Japanese application 64511/63 filed Dec. 2, 1963.

The present invention relates to a method for recording data of digital signals on magnetic tape for use in apparatus such as electronic computers, etc.

The recording of data on magnetic tape in computers or data processing systems, etc. is usually effected by a method providing a format of block recording. By this method, sequential groups or blocks of data are recorded on magnetic tape, providing a constant interval between blocks of recorded data. These intervals are referred to as interrecord gaps. According to the conventional block recording method, two storage units comprising so-called magnetic cores are used. The conventional block recording method is not economical by the reason of the necessity of using two units of magnetic cores, each having a storage capacity corresponding to the number of data being recorded in one block on the magnetic tape. Therefore, the method has the disadvantage that the size of the magnetic core storage must be increased with an increase of the number of data being recorded in one block on the magnetic tape.

The principal object of the invention is to provide an improved method of block recording of data incoming at an almost constant rate, using a single storage unit and a recording unit comprising recording means and tape transport means.

Another object of the invention is to provide a method of block recording using a tape transport means which moves the magnetic tape at a constant speed.

Still another object of the invention is to provide a method of block recording using a single storage unit having a capacity equivalent to or greater than the number of the input data during the motion of the tape over the length of an interrecord gap but less than the number of data to be recorded in one block.

A further object of the invention is to provide a method of block recording capable of selecting a block size and a length of interrecord gap from several different values in a specific system.

Since the features of the invention are provided by using a much smaller storage capacity than heretofore required, it is possible to reduce the cost and size of the system.

The invention will be better understood from the following description taken in connection with the accompanying drawings in which.

Figure 3:
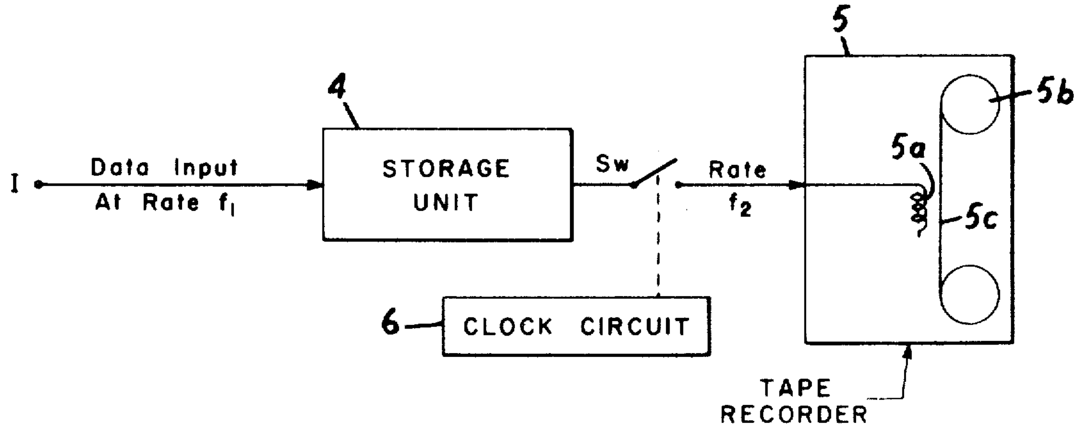
FIG. 3 is a schematic diagram illustrating the method for block recording according to an embodiment of the invention.

Before explaining the embodiment of tee invention shown in FIG. 3, it is helpful to explain the conventional system, to clarify the features of the present invention.

Figure 1:
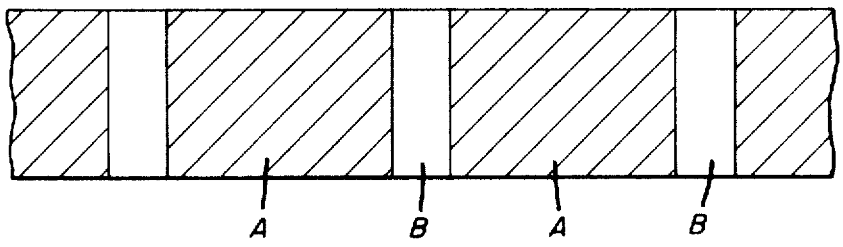
FIG. 1 is a diagram to explain a format of block recording on a magnetic tape.
Figure 2:
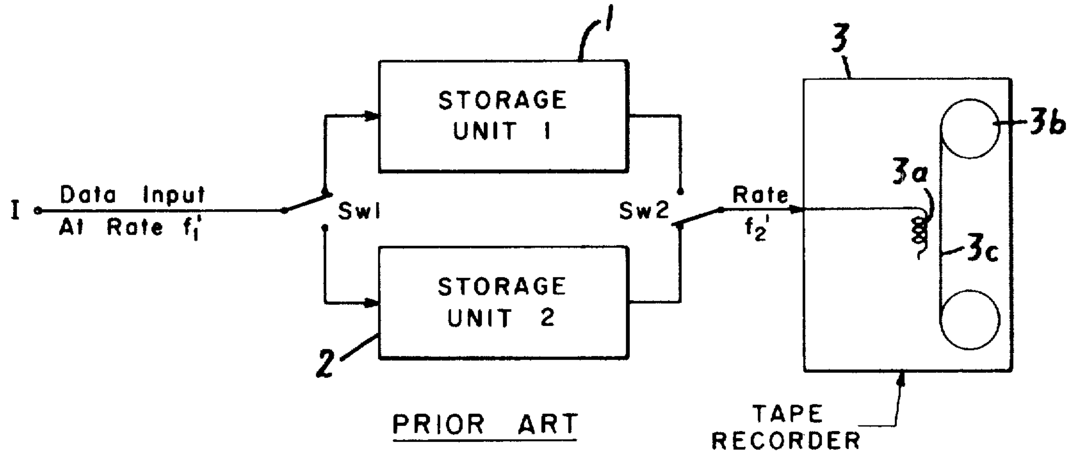
FIG. 2 is a schematic diagram illustrating a prior art method for block recording.

As illustrated in FIG. 1, the hatched portions A of a magnetic tape indicate "recorded" portions, each of which is herein called a "block" and other portions B which are blank indicate nonrecorded portions that are herein called "interrecord gaps," sometimes abbreviated as IRG. on the tape. The number of bits being recorded in one block is In the conventional method of block recording shown in FIG. 2, there are provided two storage units 1 and 2, each comprising magnetic cores, and a magnetic tape recording unit 3. The storage capacity of each storage unit has a value corresponding to the number of bits to be recorded in one block on the tape. The number of bits being recorded in one block is herein designated as N bits. The magnetic recording unit 3 comprising recording means 3*a* and a tape transport means 3*b* records the data of digital signals on a magnetic tape 3*c*.

By means of a double throw switch $Sw_1$, the data to be recorded is fed alternatively to the storage unit 1, or to the storage unit 2. A double throw switch $Sw_2$ feeds the data stored respectively in the storage unit 2 or 1 to the recording unit 3.

The manner of operation of the switches $Sw_1$ and $Sw_2$ is as follows: in a first stage, the switch $Sw_1$ connects the input terminal I to the storage unit 1, and the switch $Sw_2$ connects the storage unit 2 to the recording unit 3, so that the data of electrical signals are fed to the storage unit 1 at a rate $f_1'$ corresponding to the incoming data. After the storage unit 1 has stored the data of N bits which correspond to its storage capacity, the connections of the switches $Sw_1$ and $Sw_2$ are simultaneously reversed. Data is then fed continuously to the storage unit 2 in the same manner at a rate $f_1'$ and, at the same time, the data that has been stored in the storage unit 1 begins to be recorded on the magnetic tape in the recording unit 3 at a rate $f_2'$. After N bits of data have been fed to the storage unit 2, the connections of the switches $Sw_1$ and $Sw_2$ are again reversed and the foregoing operation is repeated. By keeping the relation $f_1'<f_2'$ and by repeating the above-mentioned operation, a recorded magnetic tape in a format of block recording as shown in FIG. 1 is obtained. In this case, the time $T_1$ required to feed the data of N bits to the storage unit 1 or 2 and the time $T_2$ required to record the data of N bits on the magnetic tape by the recording unit 3 are given by $$T_1=N/f_1'$$
$$T_2=N/f_2'$$

Now, since $f_1'<_2'$, $T_1>T_2$, and $$\Delta T=T_1-T_2>0$$

with $T_1=T_2\Delta T$, with the tape fed continuously at a constant speed by the tape transport, ΔT is the time corresponding to the motion of the tape over the length of an interrecord gap. In this case, N bits of data are recorded in one block.

In the foregoing case, the magnetic tape in the recording unit 3 is fed continuously at a constant speed and does not stop when the switches $Sw_1$ and $Sw_2$ are switched over. As above mentioned, the conventional block recording method requires two storage units, each of which has a storage capacity corresponding to the number of data being recorded in one block. Therefore the size of the storage unit must be enlarged if it is desired to increase the number of data to be recorded in one block. Thus, the conventional method of block recording is uneconomical.

FIG. 3 shows an embodiment of the invention providing a single storage unit 4 to store the data from an input terminal I, the capacity of the unit being M bits, a magnetic tape recording unit 5 comprising tape transport means 5*b* with a constant tape speed and recording means 5*a* to record the data on a magnetic tape 5*c*, and a switch Sw to feed the storage output of the storage unit 4 into the recording unit 5. Although the switch Sw could be controlled manually, it is shown as being operated under control of a clock circuit 6.

With this apparatus, the method of the invention is performed by the following manner: In the first stage, the data are fed to and stored in the storage unit 4 at a rate $f_1$ corresponding to the rate of the incoming data while switch Sw is kept in an open or "off" condition so that no data is recorded although the tape is being moved at constant speed by the tape transport. Then, just after storing the data of M bits, the switch Sw is changed to closed or "on" condition instantaneously and the data that has been stored in the storage unit 4 begins to be recorded on the magnetic tape 5*c* by the recording unit 5 at a rate $F_2$, while the storing operation of the storage unit 4 is still continued.

In this case, if $f_1<f_2$, that is, the recording rate is faster than that of storing, the data stored in the storage unit 4 are gradually exhausted after a definite time. The switch Sw is then changed to "off" condition simultaneously when the data stored in the storage unit are completely exhausted, and hence the recording operation of the recording unit 5 is stopped while the tape continues to be moved at constant speed by the tape transport means 5*b*. This condition is continued until the number of data stored in the storage unit 4 becomes M bits. Then, the switch Sw is again changed to "on" condition to record the data on the magnetic tape just after the number of data stored in the storage unit 4 becomes M bits.

By repetition of the foregoing cycle of operation, the data is recorded on the magnetic tape in a format of block recording. The time $\Delta T'$ corresponding to the interrecord gap is $\Delta T'=M/f_1$ since $\Delta T'$ is the time required for storing M bits of data in the storage unit 4. The recording time of one block T and the number of data N' being recorded in one block are determined by the following formulas, $N'=f_2 T=f_1 (T+\Delta T')$ $=f_1 T+M.$ Hence $$T=\frac{M}{f_2-f_1}$$

$$N'=\frac{M}{f_2-f_1}\times f_2$$

It is clear that in the process of the present invention, it is possible to select the length of the interrecord gap and the number of data being recorded in one block in suitable conditions by appropriately selecting the ratio of the rates $f_1/f_2$ and M. It is sufficient to use a storage unit with a much smaller capacity compared with those of the conventional block recording system to obtain better results.

Figure 4:
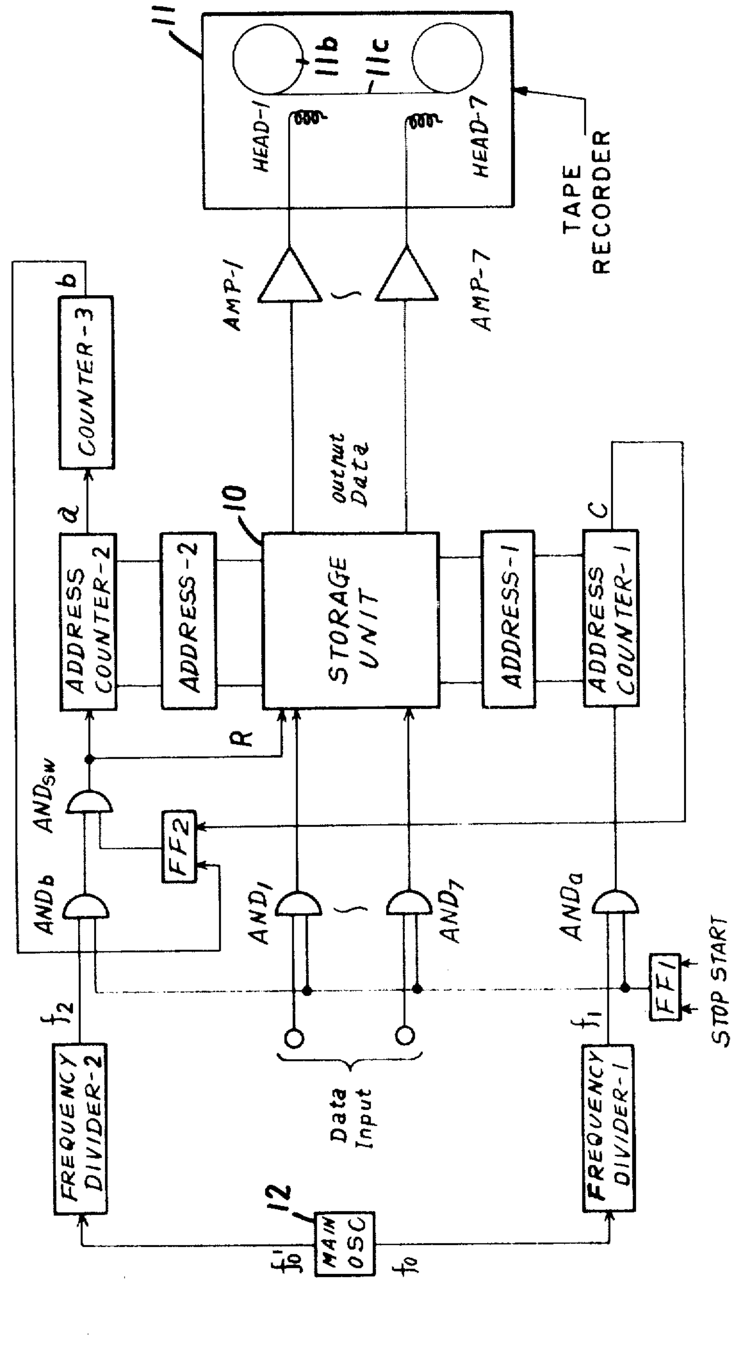
FIG. 4 is a block diagram illustrating the method for block recording according to another embodiment of the invention.

The apparatus illustrated in FIG. 4 comprises a magnetic core-type storage unit 10 and a tape recorder 11. The storage unit 10 is capable of storing seven bits of information simultaneously (six signal bits and one parity bit) and accordingly has seven data input channels. The tape recorder is likewise capable of recording seven bits of information simultaneously on a tape 11*c* driven by a tape transport 11*b* and accordingly has seven recording heads designated HEAD–1—HEAD–7 connected respectively to the output side of the storage unit 10 through amplifiers designated AMP–1—AMP–7.

Figure 5:
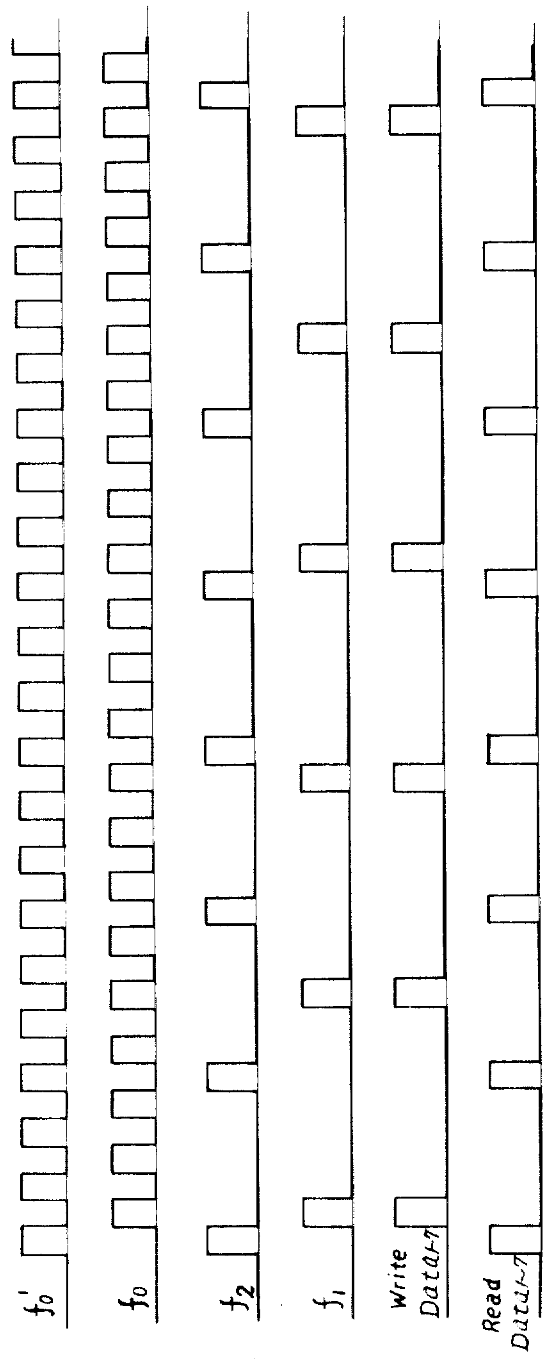
FIG. 5 is a time chart showing control pulses employed in the embodiment of FIG. 4.

The "write" and "read" functions of the storage unit 10, and hence the recording of data by the tape recorder 11 are controlled by a control system comprising a main oscillator 12 having two outputs supplying respectively clock pulses *fo* and *fo'* which are of the same frequency but 180° out of phase with one another as illustrated in FIG. 5. The clock pulses *fo* are fed to FREQUENCY DIVIDER 1 having a division factor X to yield clock pulses $f_1$ which are fed through a switch or gate $AND_a$ to ADDRESS COUNTER–1 and ADDRESS–1 controlling the "write" function of the storage unit 10. The clock pulses *fo'* are fed to FREQUENCY DIVIDER 2 having a division factor *y* to yield clock pulses $f_2$ which are fed through switches or gates $AND_b$ and $AND_{sw}$ to ADDRESS COUNTER 2 and ADDRESS 2 and also to the "read" line R of the storage unit 10 to control the "read" function of the storage unit and hence the recording function of the tape recorder 11. The division factor *x* of FREQUENCY DIVIDER 1 is lower than the division factor *y* of FREQUENCY DIVIDER 2, giving the relationships $f_1=/x$ $f_2='/y=fo/y$ (since $fo'=fo$) selecting *x* and *y* as $x>y,$ $f_1<_2$ when gate $AND_a$ and data input gates $AND_1$ to $AND_7$ are closed, input data are stored in the magnetic cores of the storage unit 10 at the rate $f_1$ in synchronism with the clock pulses $f_1$; when gates $AND_b$ and $AND_{sw}$ are closed, output data read from the magnetic cores of the storage unit 10 are recorded on the magnetic tape of the tape recorder 11 at the rate $f_2$ in synchronism with the clock pulses $f_2$. The relationship of the clock pulses is illustrated in FIG. 5.

Gates $AND_a$, $AND_b$ and $AND_1$ to $AND_7$ are controlled by a start-stop flip-flop FF1. Switch $AND_{sw}$, which corresponds to switch Sw in the embodiment of FIG. 3, is controlled by a flip-flop FF2 in response to pulses *c* received from ADDRESS COUNTER–1 and pulses *b* received from COUNTER–3 which is actuated by pulses *a* received from ADDRESS COUNTER–2 as will be explained more fully below.

Figure 6:
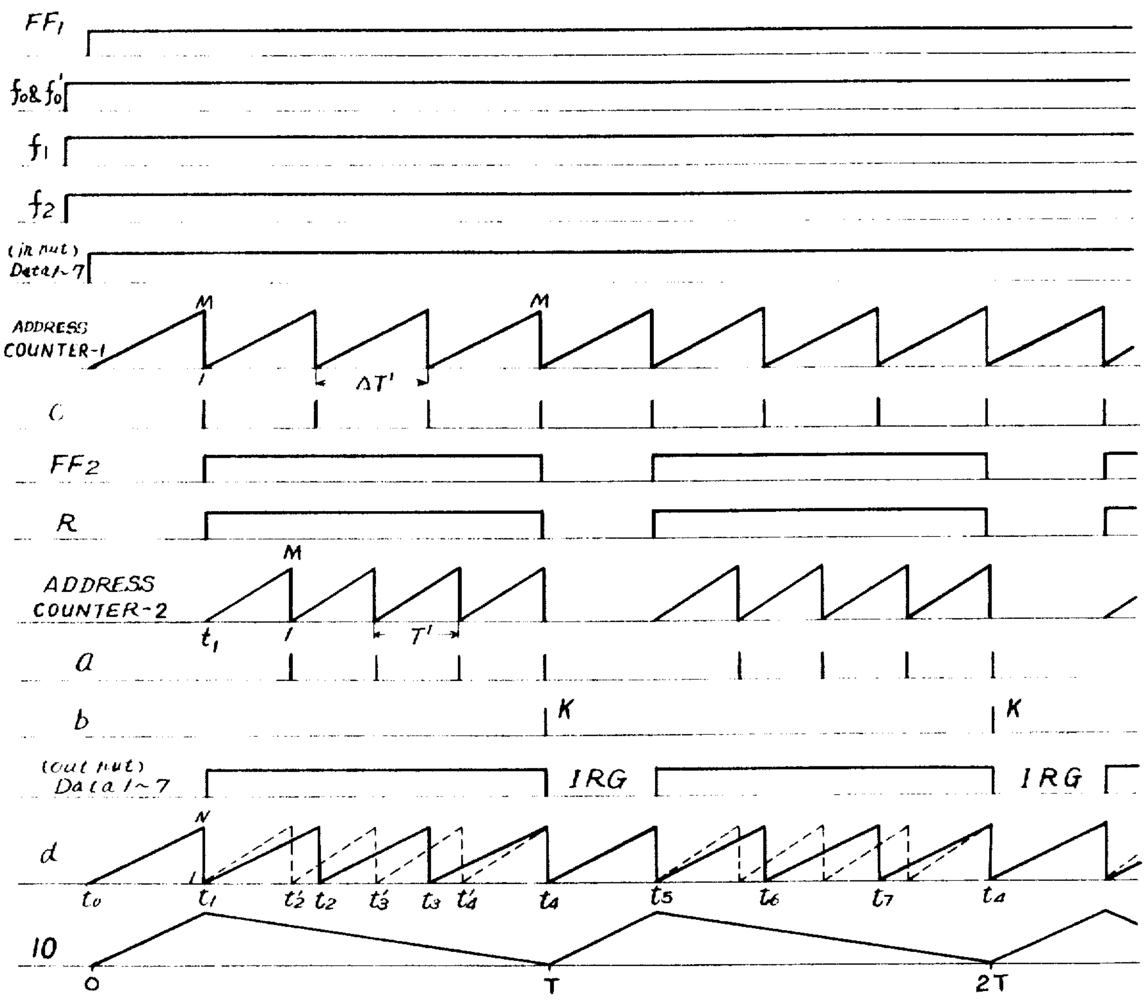
FIG. 6 is a time chart showing the operation of each part of the system illustrated in FIG. 4.

The method of the present invention will now be explained with reference to the apparatus shown in FIG. 4, assuming the division factors of the frequency dividers to be $x=4$ and $y=3$ whereby $f_1=/4$ and $f_2=fo'/3=fo/3$ as illustrated in FIG. 5. The time relationship of the several functions is illustrated in FIG. 6. When a start signal enters the flip-flop FF1 and sets it, the AND gates $AND_a$, $AND_{1\text{-}7}$ and $AND_b$ are actuated to cause the write clock pulse $f_1$ to enter the ADDRESS COUNTER–1 through the AND gate $AND_a$, and the output determines the address of the magnetic cores of the storage unit to store the input data for each write pulse of $f_1$ by means of the address logic ADDRESS–1. Data are thus stored in the storage unit 10 at the rate $f_1$. At this time, as the flip-flop ($FF_2$) for actuating the switch $AND_{sw}$ is in reset condition, the switch $AND_{sw}$ is kept in an open or "off" condition, so that the data stored in the magnetic cores are not read.

Since the storage operation of the input data into the core storage is made at the rate $f_1$, starting from the core element of the first address (No. 1 for example) and ending at the element of the last address (No. M for example), the whole storage unit 10 is filled up with N–data in a time $T_1$ after the beginning of the storage operation: $T_1=N/f$.

At the moment when the whole storage unit 10 is filled up, that is, corresponding to the storing of a datum into the last storage element of the address number M, or corresponding to the transition of the condition of the ADDRESS COUNTER–1 from the count number M to 1, a control pulse *c* is generated by the ADDRESS COUNTER–1. This is shown by the references "ADDRESS COUNTER–1" and *c* in the time chart (FIG. 6). This pulse signal *c* enters the "set" input of the flip-flop FF2 and turns the flip-flop FF2 to a set condition to actuate the gate $AND_{sw}$ to turn it to a closed or "on" condition. Therefore, the "read" clock pulses $f_2$ enter the ADDRESS COUNTER–2 and the read line R of the core storage unit 10. The data stored in the magnetic cores by the abovementioned process are thereupon read and are fed through AMPLIFIERS 1—7 to the recording HEADS 1—7 of the tape recorder 11. This situation corresponds to the time $t_1$ indicated on the reference lines "ADDRESS COUNTER–2" and *d* in the time chart (FIG. 6). The tape transport 11*b* of the tape recorder starts at the beginning of operation, being controlled, for example, by flip-flop FF1 and continues to run at constant speed.

Starting from the first address (No. 1) of the storage element, the "read" operation is made at the rate $f_2$ and the address of the storage element, from which a datum is read, is determined by the ADDRESS COUNTER–2, with the aid of the address logic ADDRESS–2 arriving at the last address (No. M) in a time $T_2$ after the beginning of the read operation, where $T_2=N/f_2$ In this period, the "write" operation is still being continued at the rate $f_1$ and at the end of this period $T_2$ the address of the storage unit, in which a datum is written, is $$T_2 f_1=\frac{Mf1}{f_2}\left(=M\left(1-\frac{f_2-f_1}{f_2}\right)\right)$$

At this moment, that is, corresponding to the reading of a datum from the last address M and the transition of the condition of the ADDRESS COUNTER–2 from the count number M to 1, a shift pulse *a* is generated by the ADDRESS COUNTER–2. This situation corresponds to the time $t_2'$ of the time chart (FIG. 6).

The shift pulse *a* enters and steps the repetition counter COUNTER–3. While the write and read operations are continued by the ADDRESS COUNTERS–1 and 2, an *a* pulse is generated by the ADDRESS COUNTER-2 at the each end of the read cycles of the storage unit 10 when, after the repetition of K cycles, the corresponding write address is $$N\left(1-K\frac{f_2-f_1}{f_2}\right)$$

Each of the *a* pulses steps the repetition COUNTER-3 which also generates shift pulse *b* corresponding to the transition of the condition from the count number K to 1. In the example illustrated in FIG. 6, K=4. The number of data N' recorded in one block on a tape is: N'=4M bits.

The *b* pulse enters the reset input of the flip-flop ($FF_2$), turning it to the reset condition and the switch $AND_{rw}$ to the open or "off" condition, thereby interrupting the "read" operation, while the "write" operation is continued. This situation corresponds to the time $t_4$ in the time chart FIG. 6. It will be seen that at time $t_4$, the conditions of the components of the apparatus are the same as at the starting time $t_0$. The number of data stored at any instant in the storage unit 10 is indicated by the line 10 in FIG. 6, increasing to a maximum at time $t_1$, and then decreasing to zero by time $t_4$.

The operation which has been described is then repeated. It will be seen that between time $t_4$ and $t_5$, data continuous to be stored while the "read" operation is interrupted. As the tape transport **11*b*** continues to run at constant speed, there is formed an interrecord gap IRG. At time $t_5$, a pulse *c* from ADDRESS COUNTER 1 again actuates flip-flop FF2 to close switch $AND_{rw}$ and start recording of the next block on the tape.

In the operation described, the write clock pulse $f_1$ and the read clock pulse $f_2$ of magnetic cores have the relations:

$f_1=fo/4, f_2=fo'/3, f_1<f.$

Accordingly, the data begins to be stored in the magnetic cores at the time $t_0$ and when the storing operation has been continued until the time $t_1$, that is, after the lapse of time $T_1$, the whole of the cores are filled up with the data. At this moment, that is, at the time $t_1$, the "read" operation from the cores begins, and after the lapse of time from $t_1$ to $t_2'$, that is when the time $T_2$ has passed, one-fourth of the storage unit becomes empty; at the time $t_3'$, that is when the time $2T_2$ has passed after the time $t_1$, one-half of the storage unit becomes empty; at the time $t_4'$, that is when the time $3T_2$ has passed after the time $t_1$, three-fourths of the storage unit becomes empty; and at the time $t_4$, that is, when the time $4T_2$ has passed after the time $t_1$, the whole storage unit becomes empty. This is shown by the reference line 10 in FIG. 6.

By this time, the reading of the data stored in the core of the first address (No. 1) to the core of the last address (No. N) has been repeated four times (of course, the storing of the data in the core has also been repeated four times), so four pulse signals *a* have come out of the ADDRESS COUNTER-2 and entered the COUNTER-3, and one pulse signal *b* has come out of the COUNTER-3 and entered the reset input of the flip-flop $FF_2$, thus making the flip-flop $FF_2$ turn the switch $AND_{rw}$ to the open or "off" condition. Therefore, the read clock pulses $f_2$ cease to enter the ADDRESS COUNTER-2 and the read line R of the storage unit 10, and the "read" operation from the magnetic cores stops. By the operations up to this stage, a number KN of the input data is recorded as one block on the magnetic tape. The time $t_4$ to $t_5$ during which the "read" operation is stopped gives an interrecord gap IRG, since the magnetic tape is being continuously moved by the tape transport during the time in which the "read" operation is interrupted. During all this time the data continue to be stored in the magnetic cores of the storage unit 10.

The described cycle of operation is repeated to record the next block of data on the tape, and so on.

From the foregoing description it will be clear that the storage capacity of the storage unit required for the method of this invention is only one-fourth of the capacity of one block and, therefore, is one-eighth of the capacity of the storage unit used in the conventional method. It is, of course, to be noted that the ratio of the capacity of the storage unit to the capacity of one block of tape can optionally be selected by changing the rates $f_1$ and $f_2$. Thus, the storage capacity of the storage unit according to the method of this invention is far smaller than that required in the conventional method.

The present method for block recording has remarkable usefulness in the fields of computer and data processing arts, etc.

It will be understood that the invention is not limited to the use of storing units with magnetic cores or to other specific characteristics of the equipment to which reference is herein made by way of example.

It is intended, therefore, that all matter contained in the foregoing description and in the drawings shall be interpreted as illustrative only and not as limitative of the invention.

We claim:

1. A method of block recording data on a magnetic tape by means of a single storage unit and a recording unit comprising recording means and tape transport means, which comprises the steps of storing M bits of data in said storage unit at a rate $f_1$ while said tape is being moved by said transport means but no data is being recorded, thereupon feeding stored data from said storage unit to said recording unit and recording said data on the tape at a selected rate $f_2$ which is greater than $f_1$ and is less than $Mf_1$ while said tape is continuously moved by said transport means and while continuing to store data in said storage unit at a rate $f_1$, continuously performing said recording step at a rate $f_2$ until all of the stored data have been recorded, thereby providing a block of data which has a number of information bits greater than M and is recorded on said tape, interrupting the recording of data on the tape while continuing the storing of data in said storage unit at a rate $f_1$ until M bits of data have again been stored and while continuing the transport of said tape to provide an interrecord gap, thereupon again recording the stored data on the tape to provide a succeeding block of data recorded on said tape, and repeating the foregoing cycle of operation to form on said tape successive blocks of data separated by interrecord gaps.

2. A method of recording data on a magnetic tape according to claim 1 comprising the additional step of selecting M so that the number of bits of data recorded in each block on said tape is an integral multiple greater than 1 of the number of M bits.

3. A method of block recording according to claim 1, comprising the additional step of selecting $f_1$, $f_2$ and M so that said interrecord gap has a length equivalent to the positions required for the recording of M bits.

4. A method of block recording data on a magnetic tape by means of a single storage unit having a plurality of storage positions, and a recording unit including recording means and tape transport means, which comprises the steps of storing M bits of first data in M positions of said storage unit at a rate $f_1$; thereupon feeding said stored first data from said storage unit to said recording unit and recording said data on the tape at a selected rate $f_2$ which is greater than $f_1$; storing additional data in said storage unit at said rate $f_1$ while continuing the recording of said stored first data on the tape at said rate $f_2$, said additional data being stored in said M positions which have been already read into said tape.